United States Patent
Pfeilschifter et al.

(10) Patent No.: US 11,667,204 B2
(45) Date of Patent: Jun. 6, 2023

(54) VEHICLE CHARGING CIRCUIT AND VEHICLE ELECTRICAL SYSTEM HAVING THE VEHICLE CHARGING CIRCUIT

(71) Applicant: Vitesco Technologies GmbH, Regensburg (DE)

(72) Inventors: Franz Pfeilschifter, Munich (DE); Martin Götzenberger, Munich (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 17/640,060

(22) PCT Filed: Sep. 17, 2020

(86) PCT No.: PCT/EP2020/075935
§ 371 (c)(1),
(2) Date: Mar. 3, 2022

(87) PCT Pub. No.: WO2021/053053
PCT Pub. Date: Mar. 25, 2021

(65) Prior Publication Data
US 2022/0340027 A1    Oct. 27, 2022

(30) Foreign Application Priority Data
Sep. 19, 2019   (DE) .............. 10 2019 214 299.0

(51) Int. Cl.
*B60L 53/22* (2019.01)
*H02J 7/02* (2016.01)

(52) U.S. Cl.
CPC .............. *B60L 53/22* (2019.02); *H02J 7/02* (2013.01); *H02J 2207/20* (2020.01)

(58) Field of Classification Search
CPC ...... B60L 53/22; B60L 2210/14; B60L 53/11; B60L 53/14; B60L 2210/10; H02J 7/02;
(Continued)

(56) References Cited

U.S. PATENT DOCUMENTS 9,257,864 B2 * 2/2016 Pahlevaninezhad ...... H02J 7/02
10,158,245 B2   12/2018 Yang et al.
(Continued)

FOREIGN PATENT DOCUMENTS

CN    205123596 U     3/2016
DE   102016224590 A1  3/2018
(Continued)

OTHER PUBLICATIONS

International Search Report and Written Opinion for International Application No. PCT/2020/075935, dated Dec. 23, 2020, with partial English translation, 9 pages.
(Continued)

*Primary Examiner* — Paul Dinh
(74) *Attorney, Agent, or Firm* — RatnerPrestia

(57) ABSTRACT

A vehicle charging circuit includes an AC voltage connection that has a plurality of potentials, a switch device, a plurality of rectifiers that are each in the form of a bridge rectifier, a plurality of step-up converters, and a plurality of galvanically isolating DC-DC converters. Inputs of the rectifiers are connected to one other. The interconnected inputs of the rectifiers are connected to the AC voltage connection via the switch device. The rectifiers each have an output, downstream of each of which is connected one of the step-up converters. The step-up converters are connected to a rechargeable battery connection of the vehicle charging circuit.

11 Claims, 1 Drawing Sheet

(58) Field of Classification Search
CPC ...... H02J 2207/20; Y02T 10/92; Y02T 10/70; Y02T 10/7072; Y02T 10/72; Y02T 90/14; B60Y 2200/91
USPC .......................................................... 320/109
See application file for complete search history.

(56) References Cited

U.S. PATENT DOCUMENTS

| | | |
|---|---|---|
| 10,283,990 B2 | 5/2019 | Fuchs et al. |
| 11,207,993 B2 | 12/2021 | Pfeilschifter et al. |
| 2019/0074775 A1 | 3/2019 | Chimento et al. |
| 2019/0202300 A1 | 7/2019 | Pastor et al. |
| 2021/0408889 A1* | 12/2021 | Zhu .......................... B60L 53/22 |

FOREIGN PATENT DOCUMENTS

| | | |
|---|---|---|
| DE | 102016122008 A1 | 5/2018 |
| JP | 2014053992 A | 3/2014 |
| WO | 2013093963 A1 | 6/2013 |
| WO | 2019030125 A1 | 2/2019 |

OTHER PUBLICATIONS

International Search Report and Written Opinion for International Application No. PCT/2020/075935, dated Dec. 23, 2020, 15 pages (German).
German Examination Report for German Application No. 10 2019 214 299.0, dated Aug. 19, 2020, with English translation, 6 pages.

* cited by examiner

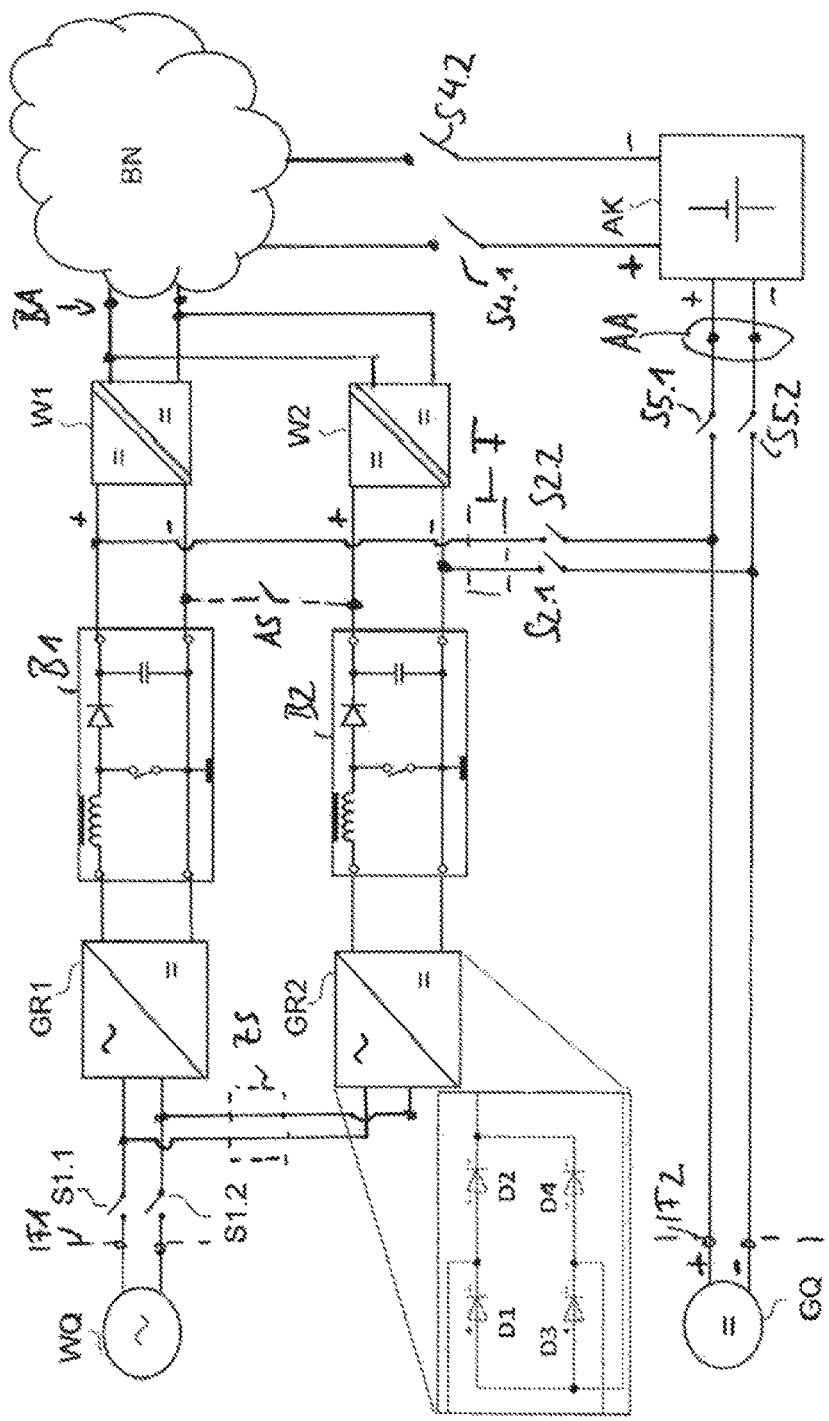

VEHICLE CHARGING CIRCUIT AND VEHICLE ELECTRICAL SYSTEM HAVING THE VEHICLE CHARGING CIRCUIT

CROSS REFERENCE TO RELATED APPLICATIONS

This application is the U.S. National Phase Application of PCT International Application No. PCT/EP2020/075935, filed Sep. 17, 2020, which claims priority to German Patent Application No. 10 2019 214 299.0, filed Sep. 19, 2019, the contents of such applications being incorporated by reference herein.

BACKGROUND OF THE INVENTION

It is known practice to equip vehicles with an electrical drive that is operated by a rechargeable battery in the vehicle. This rechargeable battery is also referred to as a traction rechargeable battery. Charging connections are provided to charge the rechargeable battery. The voltage level of the charging voltage is essentially defined by the supply network that provides the charging voltage. The operating voltage of the rechargeable battery is dependent on the nominal voltage of the rechargeable battery and on the state of charge of the rechargeable battery, and can in particular be chosen to be significantly higher than the rms value of the charging voltage, in particular in order to be able to satisfy high power requirements.

SUMMARY OF THE INVENTION

An aspect of the invention presents an option by way of which the charging voltage and the rechargeable battery voltage can be matched to one another and at the same time the measure concerned is inexpensive, in particular in view of the high component costs for components that have high nominal voltages.

A vehicle charging circuit is proposed in which not only is there a power path connected to two AC voltage phase conductors, which power path contributes to supplying power to the rechargeable battery or the on-board electrical system, but also in which a plurality of rectifiers, and converters respectively connected downstream of the rectifiers, are connected to the same two potentials of the AC voltage connection. The converters each have a capacitor (a DC link capacitor), said capacitors being connected in series with one another by the rectifiers. The series connection halves the voltage to be carried by the DC link capacitor. In other words, this results in the operating voltage of the rechargeable battery being divided between two (or generally between a plurality of) DC link capacitors of the two or more converters that are connected downstream of the two or more rectifiers, wherein the rectifiers are connected to the same two AC voltage potentials (of the AC voltage connection). The DC link circuit capacitors can therefore be designed more cost-effectively for a lower nominal voltage.

A vehicle charging circuit is therefore proposed that has an AC voltage connection that has a plurality of potentials. In this case, the plurality of potentials are in particular two potentials, for example a first phase conductor and a second phase conductor. In this case, the intention is in particular to use a single-phase three-wire network as power supply network for the AC voltage connection, in which the two outer conductors render the plurality of potentials. In particular, the plurality of potentials are therefore two potentials, wherein, in the US system, for example, an AC voltage of 240 volts (2×120 volts) is present between these two potentials, provided that the potentials correspond to the outer conductor potentials of the single-phase three-wire network.

The vehicle charging circuit also comprises a switch device. Said switch device is connected downstream of the AC voltage connection. The switch device comprises one or preferably a plurality of switching elements. In particular, a switching element that is connected downstream of the AC voltage connection is provided for each potential of the AC voltage connection. As already mentioned, the two or more potentials of the AC voltage connection can be phase conductors of an AC voltage network, or can comprise a neutral conductor and a phase conductor of an AC voltage network.

The vehicle charging circuit also comprises a plurality of rectifiers. These are each in the form of a bridge rectifier. In other words, the rectifiers are each in the form of a Graetz bridge and are therefore configured to rectify a full wave.

The vehicle charging circuit also comprises a plurality of galvanically isolating DC-DC converters. In this case, the number of rectifiers corresponds to the number of DC-DC converters. Preferably, exactly one DC-DC converter is connected downstream of each rectifier (directly or via a step-up converter). This therefore results in a plurality of paths, in particular the same number of paths as the rectifiers or the DC-DC converters. Each path comprises a rectifier and a DC-DC converter, wherein each path is connected to the AC voltage connection and in each path the DC-DC converter is connected between the DC-DC converter and the AC voltage connection.

The inputs of the rectifiers are connected to one another. In this case, each rectifier comprises a number of inputs that corresponds to the number of potentials. In one embodiment, each rectifier is provided with two inputs, wherein the AC voltage connection also has two potentials (preferably potentials for two outer conductors of a single-phase three-wire network). The inputs of the rectifiers are connected to one another, in particular in parallel. In this case, the first potentials of each rectifier are connected to one another and the second potentials of each rectifier are connected to one another. Different potentials of the same rectifier are not connected to one other. The interconnected inputs of the rectifiers are connected to the AC voltage connection via the switch device. The switch device is therefore connected upstream of the parallel connection of the inputs of the rectifiers and is located between this parallel connection of the rectifiers and the AC voltage connection. The switch device allows at least single-phase, if not all-phase, disconnection of the AC voltage connection from the rectifiers in a switchable manner.

Furthermore, outputs of different rectifiers of the plurality of rectifiers are connected to a rechargeable battery connection of the vehicle charging circuit. The vehicle charging circuit therefore comprises a rechargeable battery connection that is configured to connect a rechargeable battery, in particular a high-voltage rechargeable battery. The rechargeable battery connection comprises two potentials. In each case, one of the step-up converters is connected downstream of each rectifier or the output thereof. The step-up converters are connected to the rechargeable battery connection. A step-up converter is therefore connected downstream of each rectifier, which step-up converter connects the rectifier to the DC-DC converter. The rechargeable battery connection is connected to the connection between the step-up converter and the DC-DC converter.

In particular, the different DC voltage potentials of the rechargeable battery are connected to different DC-DC converters or different step-up converters, in particular to inputs of different DC-DC converters or outputs of different step-up converters. There is provision for this in such a way that the sum of a plurality of voltages from different step-up converters is applied to the rechargeable battery connection. However, the step-up converters (and also the DC-DC converters) are connected to one another via the rectifiers, resulting in a series configuration of the capacitors that are located in the DC-DC converters and/or the step-up converters. As mentioned, this series configuration divides the total voltage that is applied to the rechargeable battery connection. Therefore, the DC link capacitors concerned only have to be designed for part of the total voltage.

The individual rectifiers are connected to the individual DC-DC converters via the individual step-up converters. The DC-DC converters (each) have outputs that are connected to one another (in particular in parallel). In particular, the DC-DC converters or the outputs thereof are connected to the on-board electrical system connection. The parallel connection of the DC-DC converters is therefore connected in parallel with the on-board electrical system connection. As a result, the current produced by the DC-DC converters adds up. In this case, the rectifiers are used to passively conduct the compensating currents that flow from or to the capacitors. In this case, the rectifiers are full-wave rectifiers, meaning that the compensating currents can flow in both directions from or to the capacitors.

The individual rectifiers are connected to the individual DC-DC converters via the individual step-up converters. For each path there is therefore a rectifier that is connected to a DC-DC converter via a step-up converter, wherein the inputs of the rectifiers are connected in parallel with one another and the outputs of the DC-DC converters are connected in parallel with one another. Instead of a parallel connection, a series connection can also be provided for the inputs of the rectifiers and/or for the outputs of the DC-DC converters. The outputs of the DC-DC converters are connected to one another (as mentioned, preferably in parallel), and, connected to one another in this way, are connected to the on-board electrical system connection. The currents of the DC-DC converters add up, wherein the total voltage is distributed between the capacitors of the different DC-DC converters and/or the different step-up converters due to the parallel connection of the rectifiers.

The step-up converters each have a diode, a load inductor, a DC link capacitor and a converter switch. The load inductor and the diode are connected in series, wherein the resulting connecting point is connected to the converter switch. The diode and the load inductor form a series path of a T circuit, wherein the load inductor forms the shunt path. A DC link capacitor is connected in parallel with the diode or in the converter switch. In this case, the converter switch, diode and DC link capacitor form a pi circuit, wherein the diode forms the series arm and the converter switch and the DC link capacitor form the two different shunt arms of the T circuit. For each of the step-up converters, the diode is connected to a first DC voltage potential of the connected rectifier (preferably a positive DC voltage potential) via the load inductor. Provision is also made for the respective diode to be connected to a second DC voltage potential (preferably a negative one) of the connected rectifier via the converter switch. The DC link capacitor is preferably connected to the second DC voltage potential and to that end of the diode that is opposite the converter switch. The DC link capacitor is therefore connected to the two DC voltage potentials of the output of the step-up converter or to the two DC voltage potentials of the input of the DC-DC converter.

In particular, two paths are provided that each comprise a rectifier that is connected to a DC-DC converter via a step-up converter. The vehicle charging circuit is therefore equipped with two rectifiers and two DC-DC converters (and with two step-up converters that connect these in each case). The DC-DC converters each have a first input potential and a second input potential. These potentials are different and can, for example, be provided as a positive and a negative potential. The rechargeable battery connection is connected to the first input potential (preferably the positive input potential) of the first DC-DC converter and to the second input potential of the second DC-DC converter. The rechargeable battery connection is therefore connected to different DC-DC converters. This results in a sum of the two input voltages of the DC-DC converter or the step-up converters for the rechargeable battery connection.

In other words, the rechargeable battery connection is therefore connected to the two DC link capacitors of the step-up converter and/or of the DC-DC converter, which are connected to one another via the rectifiers (or via an optional switch). As mentioned, an optional switch can be provided that connects the second input potential of the first DC-DC converter to the first input potential of the second DC-DC converter in a switchable manner. The optional switch is therefore connected to those potentials of the DC-DC converter or the step-up converter that are not connected to the rechargeable battery switch. The relative switch allows the capacitors provided in the step-up converter (on the output side) and/or in the DC-DC converter (on the input side) to be directly connected in series. The AC voltage connection is preferably configured to be connected to the outer conductors of a single-phase three-wire power supply network. Such a power supply network is used in North America, for example. In this case, the supply network has two outer conductors. Compared to the central conductor (that is to say the star point) of the power supply network, said outer conductors have a voltage rotated by 180° relative to one another, so that the sum of the voltages between the respective outer conductors and the central connection is applied to the outer conductors. This can be 240 volts, for example, wherein there are 120 volts between the outer conductors and the central conductor in each case. These details relate to the rms voltage. The AC voltage connection is in particular configured to be a connection for the two outer conductors of this power supply network.

Preferably, the AC voltage connection is provided in the form of a plug-in connection element that is defined in accordance with a NEMA standard, in particular NEMA 6-15, NEMA 6-20, NEMA 6-30 or NEMA 6-50, or in accordance with NEMA 10-30 or NEMA 10-50. This allows a connection using the plug connectors mentioned, such as those used in North America, for example.

The vehicle charging circuit can also have a DC voltage connection. Said DC voltage connection is preferably connected to the DC voltage connection via rechargeable battery isolating switches of the vehicle circuit. In this case, the rechargeable battery isolating switches can the DC voltage connection from the rechargeable battery connection in a switched manner at all poles. A connecting point can be provided via which the rechargeable battery connection is connected to the DC-DC converters. This connecting point is between the rechargeable battery isolating switches and the converters. In particular, provision can be made for the DC voltage connection to be connected to the converters via connecting switches, wherein in particular the two different potentials of the DC voltage connection are connected to different potentials of the converters, and the DC voltage connection is also connected to different converters via the connecting switches.

Provision can therefore be made for the vehicle charging circuit to also have connecting switches that connect the DC voltage connection to different potentials of the outputs of the different rectifiers in a switchable manner. In this case, a positive potential can be connected to the positive potential of a first DC-DC converter via one of the connecting switches, and the negative potential of the DC voltage connection can be connected to the negative potential of a second one of the DC-DC converters via a (further) connecting switch. A filter can be provided between the connecting switches and the DC-DC converters, which filter is in particular in the form of a low-pass filter.

In particular, the DC voltage connection is connected to the inputs of the DC-DC converters, that is to say to the side of the DC-DC converters connected to the step-up converter. The DC-DC converter can therefore be connected to the outputs of the step-up converters, wherein the usual potentials of the DC voltage connection are also connected to different step-up converters in this case.

The inputs of the rectifiers can be connected to one another directly. Alternatively, the inputs of the rectifiers can be connected to one another in a switchable manner via an additional switch device. The additional switch device is of single-pole or multi-pole design. The additional switch device can be provided at all poles and can therefore isolate the input of the first rectifier from the input of the second rectifier at all poles in a switchable manner.

A vehicle electrical system comprising a vehicle charging circuit as mentioned here is also described. In addition to the vehicle charging circuit mentioned here, the vehicle electrical system comprises a rechargeable battery and an on-board electrical system branch. The rechargeable battery is preferably in the form of a high-voltage rechargeable battery. The rechargeable battery is in particular a lithium-based rechargeable battery. The rechargeable battery is preferably a traction rechargeable battery of the vehicle in which the vehicle electrical system is provided. In particular, the rechargeable battery has a nominal voltage of at least 60 volts, 100 volts, in particular of at least 400 volts, and preferably of at least 800 volts. High-voltage components are provided in the on-board electrical system branch, that is to say components with a nominal voltage of at least 100 volts, 400 volts or preferably of at least 800 volts. In particular, the on-board electrical system can have an electrical drive, for example an inverter and/or an electric machine. The drive is a traction drive of the vehicle in which the vehicle electrical system or the vehicle charging circuit is provided. There can be a connection between the rechargeable battery and the on-board electrical system branch, which connection is direct or preferably has an all-pole isolating switch. The rechargeable battery can be connected to the rechargeable battery connection of the vehicle charging circuit. In this case, the rechargeable battery is connected via the rechargeable battery isolating switch to the connecting switch, which in turn is routed to the DC-DC converters (that is to say to the inputs of the DC-DC converters). The on-board electrical system branch is connected to the on-board electrical system connection of the vehicle charging circuit. The on-board electrical system branch is therefore connected to the outputs of the converters, in particular to the parallel connection thereof. An isolating switch can be provided between the on-board electrical system branch and the on-board electrical system connection, or a direct connection can be provided (switch-free).

BRIEF DESCRIPTION OF THE DRAWINGS

The FIGURE is used to provide an exemplary explanation of the vehicle charging circuit described here and the vehicle electrical system described here.

DETAILED DESCRIPTION OF THE PREFERRED EMBODIMENTS

The FIGURE shows a vehicle charging circuit comprising an AC voltage connection IF1 and a DC voltage connection IF2. Both connections are charging connections. The two phases of the AC voltage connection IF1 are connected to rectifiers GR1 and GR2 via a switch device S1.1 and S1.2. In this case, the inputs, that is to say the AC voltage connections of the rectifiers GR1 and GR2, are connected in parallel with one another, wherein this parallel connection is in turn connected in parallel with the AC voltage connection IF1. An additional switch device ZS can be provided that connects the inputs of the rectifiers GR1 and GR2 to one another in a switchable manner. In each case, a step-up converter B1, B2 is connected downstream of the rectifiers. In turn, two DC-DC converters W1, W2 are connected downstream of the step-up converters B1, B2. The outputs of the DC-DC converters W1, W2 are connected in parallel with one another. This parallel connection is in turn connected in parallel with the on-board electrical system connection BA. The on-board electrical system BN is connected to the on-board electrical system connection BA. The on-board electrical system BN is not part of the vehicle charging circuit, but rather is part of the vehicle electrical system shown in The FIGURE.

External voltage sources WQ and GQ can be connected to the connections IF1 and IF2, which are part of the vehicle charging circuit and the vehicle electrical system (WQ is an AC voltage source and GQ is a DC voltage source). The voltage sources are not part of the vehicle electrical system and also not part of the vehicle charging circuit.

The rectifiers GR1 and GR2 are implemented in the form of a Graetz bridge, as shown by way of example using the rectifier GR2. In this case, there are two diode bridges, namely a first diode bridge D1, D2 and a second diode bridge D3 and D4. The two phases of the AC voltage connection IF1 are connected to the connecting points of the respective diode bridges (via the switches S1.1 and S1.2). The connecting points of the diode half-bridges D1, D2 on the one hand and D3, D4 on the other hand form the input of the rectifiers GR1, GR2. Each diode half-bridge has a first end toward which the conducting directions of the diodes point, wherein these ends of the diode half-bridges are connected to one another. The opposite ends of the two diode half-bridges are also connected to one another. The two ends form the output of the rectifiers GR1 and GR2 and are each connected individually to the step-up converters B1, B2 or to the inputs thereof.

The DC-DC converters 131, B2 each have a series-connected load inductor at the input, which load inductors are connected to the opposite potential in a switchable manner via a converter switch. The load inductors are shown here in the positive branch, wherein the converter switches make a connection from the inductors to the negative potential in a switchable manner. In each step-up converter 131, B2, a diode is connected downstream of the load inductor, the forward direction of which diode points away from the load inductor. A capacitor is connected downstream of the diode and connects the diode in parallel with the opposite potential. In the embodiment shown, this therefore results in a series connection, which comprises the load inductor and the diode, in the positive potential. The converter switch is provided a connecting point between these components and connects the connecting point to the negative potential. The capacitor is located at the output of the step-up converter, while the load inductor is located at the input. At the output of the step-up converter, the capacitor connects the positive potential to the negative potential and is therefore used for smoothing.

An optional switch AS is connected between the negative potential of the step-up converter B1 and the positive potential of the second step-up converter B2. As mentioned, this switch is optional and can also be omitted. If said switch is omitted, then a series connection is created by the rectifiers GR1 and GR2 or by the diodes D1 to D4 of the diode bridge, with the result that the capacitors of the step-up converters are connected in series with one another. The positive potential of the DC voltage connection IF2 is connected to the positive potential between the first step-up converter B1 and the first DC-DC converter W1. The negative potential of the DC voltage connection GF2 is connected to the negative potential of the connection between the second step-up converter B2 and the second DC-DC converter W2. The connection between the DC voltage connection IF2 and the DC-DC converter W1, W2 or the step-up converters 131, B2 is routed via a connecting switch. Said connecting switch is configured to break the connection to the DC voltage connection IF2 at all poles. It should be noted that the DC voltage connection IF2 has two potentials that are connected to different converters W1, W2 or to the inputs thereof. If a voltage of, for example, 800 volts is thus applied to the DC voltage connection IF2, this voltage is divided between the two capacitors of the step-up converters 131, B2 or between capacitors that are provided on the input side in the DC voltage converter W1, W2 (not shown), since these are connected to the AC voltage inputs of the rectifiers GR1, GR2 via the rectifier bridges and the parallel connection of the rectifiers GR1, GR2. The connection can also be provided by the optional switch AS.

Between the DC voltage connection IF2 and the rechargeable battery AK, there are rechargeable battery isolating switches S5.1 and S5.2 that allow the rechargeable battery AK to be disconnected at all poles. In particular, said rechargeable battery isolating switches enable all-pole disconnection of the rechargeable battery connection AA to which the rechargeable battery AK is connected. The connection of the connecting switches S2.1, S2.2 is not routed via the rechargeable battery isolating switches S5.1, S5.2, but rather is routed directly to the DC voltage connection IF2.

There can also be a further connection, which can be switched by means of the switches S4.1 and S4.2, between the rechargeable battery AK and an on-board electrical system branch BN that is connected to the on-board electrical system connection BA. The on-board electrical system can therefore be fed directly by the rechargeable battery, can be fed by the on-board electrical system connection BA and therefore by the converters W1, W2, or by both.

Due to the voltage division of the voltage that is applied to IF2, the capacitors of the step-up converters W1, W2 or of the converters W1, W2 can be dimensioned to have a relatively low nominal voltage or maximum voltage. The voltage division results from the series connection of these capacitors, which is provided by the diodes, the diode full-bridge D1 to D4, the rectifiers GR1, GR2, and from the parallel connection thereof on the input side.

The invention claimed is:

1. A vehicle charging circuit, comprising:
   an AC voltage connection that has a plurality of potentials;
   a switch device;
   a plurality of rectifiers that are each in the form of a bridge rectifier;
   a plurality of step-up converters; and
   a plurality of galvanically isolating DC-DC converters,
   wherein inputs of the rectifiers are connected to one another and the interconnected inputs of the rectifiers are connected to the AC voltage connection via the switch device, and
   the rectifiers each have an output, downstream of each of which is connected one of the step-up converters, and the step-up converters are connected to a rechargeable battery connection of the vehicle charging circuit.

2. The vehicle charging circuit as claimed in claim 1, wherein the individual rectifiers are connected to the individual DC-DC converters via the individual step-up converters, wherein the DC-DC converters have outputs that are connected to one another and that are connected to an on-board electrical system connection.

3. The vehicle charging circuit as claimed in claim 1, wherein the step-up converters each have a diode, a load inductor, a DC link capacitor and a converter switch, wherein in each case the diode is connected to a first DC voltage potential of the connected rectifier via the load inductor and is connected to a second DC voltage potential of the connected rectifier via the converter switch, and the DC link capacitor is connected to the second DC voltage potential hand to that end of the diode that is opposite the converter switch.

4. The vehicle charging circuit as claimed in claim 1, which is equipped with two rectifiers and two DC-DC converters, wherein the DC-DC converters each have a first input potential and a second input potential, and the rechargeable battery connection is connected to the first input potential of the first DC-DC converter and to the second input potential of the second DC-DC converter.

5. The vehicle charging circuit as claimed in claim 1, wherein the AC voltage connection is configured to be connected to the outer conductors of a single-phase three-wire power supply network.

6. The vehicle charging circuit as claimed in claim 1, wherein the AC voltage connection is provided in the form of a plug-in connection element that is designed in accordance with the ANSI/NEMA WD 6-2002 standard, in particular in the form of a socket or plug connector in accordance with NEMA 6-15, NEMA L6-15, NEMA 6-20, NEMA L6-30, NEMA 6-30, NEMA 6-50, NEMA L6-50, NEMA 10-30 or NEMA 10-50.

7. The vehicle charging circuit as claimed in claim 1, which also has a DC voltage connection, wherein the rechargeable battery connection is connected to the DC voltage connection via rechargeable battery isolating switches of the vehicle charging circuit.

8. The vehicle charging circuit as claimed in claim 7, which also has connecting switches that connect the DC voltage connection to different potentials of the outputs of the different rectifiers in a switchable manner.

9. The vehicle charging circuit as claimed in claim 1, wherein the inputs of the rectifiers are connected to one another directly or are connected to one another in a switchable manner via an additional switch device.

10. A vehicle electrical system comprising a vehicle charging circuit as claimed in claim 1, a rechargeable battery and an on-board electrical system branch, wherein the rechargeable battery is connected to the rechargeable battery connection of the vehicle charging circuit and the on-board electrical system branch is connected to the on-board electrical system connection of the vehicle charging circuit.

11. The vehicle charging circuit as claimed in claim 2, wherein the step-up converters each have a diode, a load inductor, a DC link capacitor and a converter switch, wherein in each case the diode is connected to a first DC voltage potential of the connected rectifier via the load inductor and is connected to a second DC voltage potential of the connected rectifier via the converter switch, and the DC link capacitor is connected to the second DC voltage potential and to that end of the diode that is opposite the converter switch.

* * * * *